(12) United States Patent
Gartland et al.

(10) Patent No.: US 7,487,099 B2
(45) Date of Patent: Feb. 3, 2009

(54) METHOD, SYSTEM, AND STORAGE MEDIUM FOR RESOLVING TRANSPORT ERRORS RELATING TO AUTOMATED MATERIAL HANDLING SYSTEM TRANSACTION

(75) Inventors: Karl E. Gartland, Essex Junction, VT (US); David Travagline, Hopewell Junction, NY (US); Zhenya Devi Ramphal, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 10/241,253

(22) Filed: Sep. 10, 2002

(65) Prior Publication Data
US 2004/0049398 A1 Mar. 11, 2004

(51) Int. Cl.
*G06Q 99/00* (2006.01)
*G06F 7/38* (2006.01)
(52) U.S. Cl. .......................................... 705/1; 700/230
(58) Field of Classification Search ................ 705/1, 705/230
See application file for complete search history.

(56) References Cited

U.S. PATENT DOCUMENTS

| | | | |
|---|---|---|---|
| 4,491,944 A * | 1/1985 | Caizergues et al. | 370/387 |
| 4,641,428 A * | 2/1987 | Anderson | 29/863 |
| 4,853,864 A * | 8/1989 | Hart et al. | 705/403 |
| 5,255,197 A * | 10/1993 | Iida | 700/108 |
| 5,980,183 A * | 11/1999 | Fosnight | 414/222.01 |
| 6,128,588 A * | 10/2000 | Chacon | 703/6 |
| 6,240,335 B1 * | 5/2001 | Wehrung et al. | 700/230 |
| 6,470,227 B1 * | 10/2002 | Rangachari et al. | 700/95 |
| 6,502,213 B1 * | 12/2002 | Bowman-Amuah | 714/49 |
| 6,877,944 B2 * | 4/2005 | Peiter | 414/279 |
| 2002/0194340 A1 * | 12/2002 | Ebstyne et al. | 709/226 |

OTHER PUBLICATIONS

Gary Legg, "300-mm Wafers and Automation Reduce Chip Costs," Designnews.com; Jun. 3, 2002; pp. 7, 8 & 10.
B. Singh, J. Kawski, T. Boardman, D. Nelson and T. Meguine; "Software Automation for Advanced Packaging;" e-Manufacturing Series; Semiconductor International; Jul. 2002; pp. 135-138.

* cited by examiner

*Primary Examiner*—Matthew S Gart
*Assistant Examiner*—Garcia Ade
(74) *Attorney, Agent, or Firm*—Cantor Colburn LLP; Lisa Jaklitsch

(57) ABSTRACT

An exemplary embodiment of the invention relates to a method, system, and storage medium for resolving a transport error relating to automated material handling system transactions in a manufacturing environment. The system comprises a host system executing manufacturing execution system software, material control system software, and communications software. The system also comprises a client system in communication with the host system via the communications software and a communications network. The system also comprises a cell controller in communication with the host system as well as production equipment in communication with the host system via the cell controller. The system further comprises an automated material handling system, integrated transport facilitation system software in communication with the host system via the communications network, and a notification generated by the integrated transport facilitation system. The notification includes details of the transport error. Other embodiments of the invention include a method and storage medium.

14 Claims, 5 Drawing Sheets

```
EVENT REPORT
         Send(CarrierJobStateChanged)
         CarrierJobStateChanged=29040
         RptID=20010,
         RptID=20011,
         RptID=20012,
         RptID=20016,
         RptID=20017,
         RptID=20024,
         U2:RptID=20017>
              <L,3
                    <B:CarrierJobState=00>
                    <B:JobRemoveFlag=01>
                    <B:Comflg=2>
         The Comflg=2 is the flag not being
interrupted by the MES
```

FIG. 3

```
TO:      SYSTEM SUPPORT
           FROM: AUTOMATED MESSAGE DELIVERY
 422       SUBJ: ERROR IN TRANSPORT MESSAGE

AN ERROR HAS OCCURRED IN TRANSPORT. ATTEMPTS
         TO RE-EXECUTE THE TRANSACTION HAVE FAILED. THE
 402     IDENTIFIED CARRIER CANNOT BE DELIVERED AS
         SCHEDULED. ERROR INFORMATION IS PROVIDED BELOW:

404——LOT ID:   014A7
 406——CARRIER ID:  VIT
 408——SOURCE EQUIPMENT ID:   T12
 410——SOURCE STOCKER: A490
 412——DESTINATION EQUIPMENT ID: B221
 414——PORT ID:  78
 416——SOURCE BAY ID:
 418——SOURCE OHV/OHT ID:
 420——OTHER: _____

DATE:
         TIME:
```

METHOD, SYSTEM, AND STORAGE MEDIUM FOR RESOLVING TRANSPORT ERRORS RELATING TO AUTOMATED MATERIAL HANDLING SYSTEM TRANSACTION

BACKGROUND

This invention relates generally to manufacturing production systems, and more particularly, the present invention relates to a method, system, and storage medium for resolving transport errors relating to Automated Material Handling System (AMHS) transactions between a Manufacturing Execution System (MES) and a Material Control System (MCS).

The efficiency of a manufacturing enterprise depends, in part, on the quick flow of information across its complete supply chain. Off-the-shelf enterprise resource planning (ERP) systems were developed and utilized for handling product planning, purchasing, supplier interactions, and customer service and soon gained widespread acceptance. Though useful, these ERP systems were not designed to manage the day-to-day plant-floor operations. Historically, it has been common practice for manufacturers to purchase commercially available MES's or build their own plant-floor control systems. For example, most semiconductor manufacturers, or fabricators (also referred to as 'FABs') purchase commercially available MES's or use some form of 'home-grown' manufacturing execution system (MES) for tracking production logistics, work-in-process (WIP), equipment status, quality, inventory, process controls, etc.

More recent advancements in shop-floor activities include the automation of production equipment, material processing, material control systems, and the integration of all these systems and applications with the host MES. Automating manufacturing processes for certain industries present many challenges. Unlike the automotive industry which employs standard assembly-line processing techniques, the manufacture of semiconductor materials generally involves non-linear processing techniques. For example, a 300-mm semiconductor FAB involves a complex and lengthy back-and-forth route in which wafers revisit numerous repetitive levels back through process tools while measurements and feedback of measurements are taken. Automating such complex routes requires a great deal of sophistication in its underlying technology. Another challenge involves the logistics of size and weight of semiconductor materials. For example, the development of 300-mm wafers which are substantially larger and heavier than their 200-mm predecessors led to multi-floor FABs necessary to accommodate these space-consuming materials. Increased automation in this regard becomes more critical in order to reduce the higher risk of injuries likely to occur with human handling and to overcome regulatory restrictions placed by various agencies.

Automated Material Handling Systems (AMHSs) were developed to move and track material carriers (also referred to as FOUPs or Front Opening Unified Pods and reticle pods) that are routed through a manufacturing facility or bay. These carriers can also be reduced pitch FOUPs, or any other type of wafer carrier, reticle carrier, or durable used in the manufacture of semiconductors. AMHS subsystems include stockers (also referred to as material storage and retrieval systems), interbay transport devices, and intrabay transport devices. Interbay transport devices move carriers from one stocker to another as well as between bays. Intrabay transport allows movement of a carrier directly to the production equipment either from a stocker or from another production equipment in the bay. Automated interbay and intrabay transport vehicles are often referred to as automatic guided vehicles (AGVs), rail guided vehicles (RGVs), or any type of overhead transport/overhead hoist transport (OHT), and overhead vehicles (OHVs). Software used for implementing AMHS activities include material control system (MCS) software. MCS software manages the automation of transportation and storage of manufacturing materials.

While stockers and interbay transport have been around for some time, automated intrabay transport is fairly new. Integrating MCS systems into the MES system is necessary to enable automated delivery and pickup, as well as automated material processing. The relative newness of intrabay transport has led to gaps in the integration of MCS with MES.

The MCS or AMHS begins the automated delivery process, but occasionally a hardware, software or human error causes the E84 handshake (a series of infrared parallel I/O signals that allows direct communication from the active AMHS vehicle or entity with the passive production equipment entity) to fail. The MCS control system will then send a message to the MES stating that the transport job was completed to an alternate location.

The MES (which receives commands back from the MCS) does not interrogate these return codes and errors but continues on operating and processing as if the error never occurred. The MES does not acknowledge the return codes or messages from the MCS message, and assumes the carrier has been delivered successfully. As a result, it also assumes that the processing instructions, as defined via the control job/process job, are being carried out. This has been confirmed by recreating this exact scenario in a test environment and documenting how all the systems interact and react to this error. The MES assumes that the reserved carrier was successfully delivered even though the associated control job, process job, and the materials defined have not been processed. The MCS sends the carrier back to the MCS stocker of its choice (often the nearest), but the carrier reservation and control job reserved for the equipment load port are not canceled by the MES.

This problem is generally caused by one of the following reasons: an E84 failure by the equipment or MCS AMHS vehicle; an operator error such as a manual delivery to the wrong load port or the wrong tool used so the load port is incorrectly occupied; a human error such as an interference with presence and placement sensors, leaving tools on the load port, or leaning on the load port; and a carrier presence and/or placement errors. Any of these events can result in substantial increases in costs as well as long delays in the manufacturing cycle.

What is needed is an efficient way to identify, track, and resolve transport failures occurring in an automated manufacturing setting.

BRIEF SUMMARY

An exemplary embodiment of the invention relates to a method, system, and storage medium for resolving a transport error relating to automated material handling system transactions in a manufacturing environment. The system comprises a host system executing manufacturing execution system software, material control system software, and communications software. The system also comprises a client system in communication with the host system via the communications software and a communications network. The system also comprises a cell controller in communication with the host system as well as production equipment in communication with the host system via the cell controller. The system further comprises an automated material handling system, integrated transport facilitation system software in communication with the host system via the communications network, and a notification generated by the integrated transport facilitation system. The notification includes details of the transport error. Other embodiments of the invention include a method and storage medium.

BRIEF DESCRIPTION OF THE DRAWINGS

Referring now to the drawings wherein like elements are numbered alike in the several FIGURES:

FIG. 3 is a sample event report generated by an MCS/AMHS upon detecting a transport failure; and FIG. 4 is a sample automated email notification generated in response to a transport failure.

DETAILED DESCRIPTION OF THE PREFERRED EMBODIMENT

Figure 1:
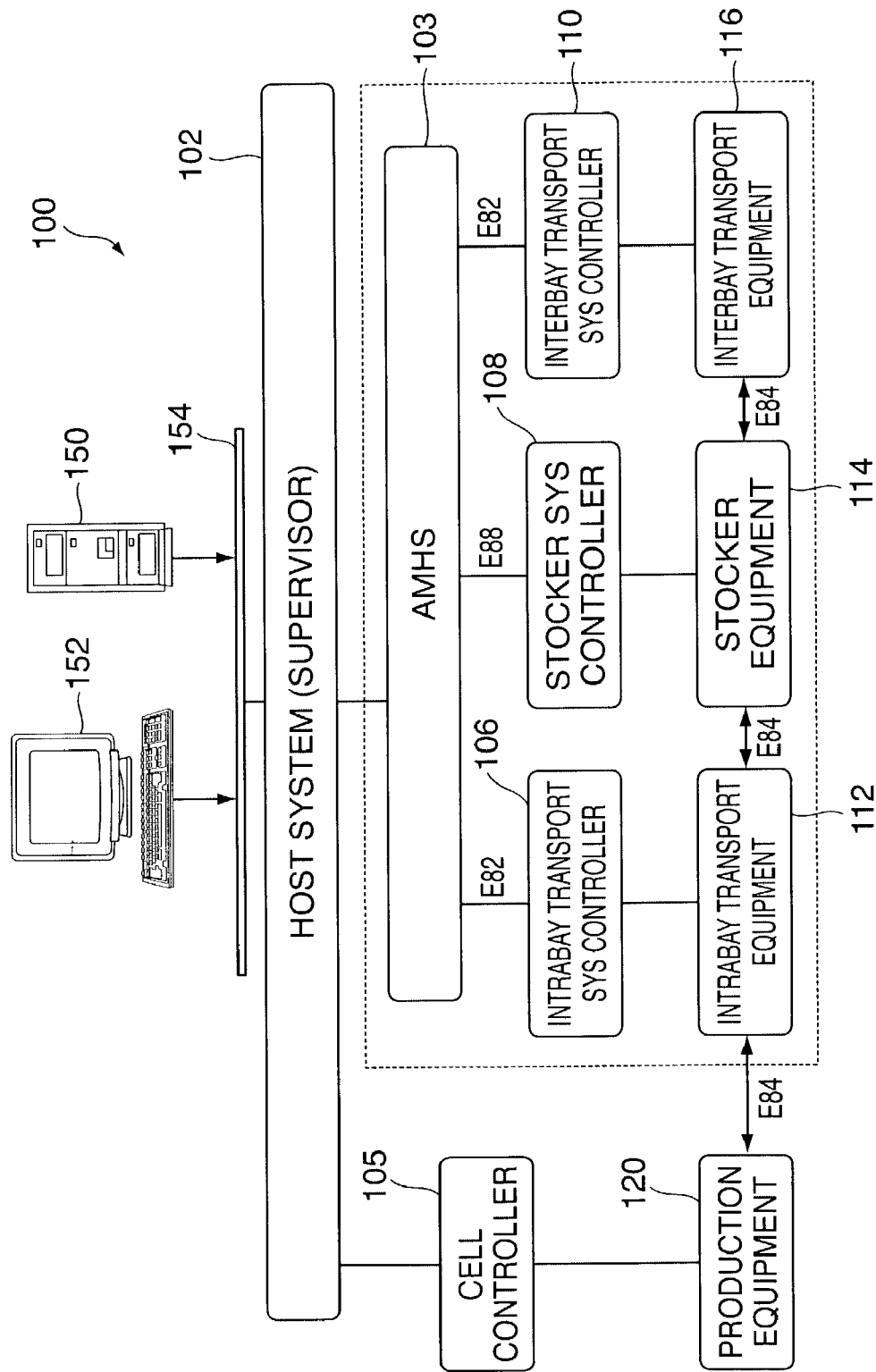
FIG. 1 is a portion of a network system upon which the integrated transport facilitation system is implemented in an exemplary embodiment.

In an exemplary embodiment, an automated material handling system (AMHS) is integrated with a manufacturing execution system as illustrated in manufacturing system 100 of FIG. 1. Manufacturing entities generally employ materials storage and transport equipment located within processing bays of its manufacturing plant (FAB) as well as communications hardware and software for automating the handling and control of these transport equipment devices and materials. System 100 includes a host system 102 comprising one or more servers 150 which are in communication with one or more client systems 152 via a wired or wireless communications network 154. Server 150 may be one or more mainframe computers or other similar high-speed servers. Further, additional servers may be included in host system 102 in order to realize the advantages of the invention. However, in the simplified diagram of FIG. 1, only one server 150 is shown. Server 150 executes software applications including, but not limited to enterprise resource planning (ERP), manufacturing execution system (MES), material control system (MCS), scheduling system, and other suitable applications.

Also included in FIG. 1 is production equipment 120 that performs one or more processes on manufacturing materials and/or components for the manufacturing entity. Production equipment 120 includes an equipment controller, or microprocessor, for communicating with cell controller 105. Cell controller 105 (also referred to as equipment integration controller and station controller) represents an interface that allows host system 102 to communicate with production equipment 120. Cell controller 105 communicates with the equipment controller of production equipment 120 via RS232, HSMS, or ethernet ports. Production equipment 120 includes fixed buffer type tools and internal buffer tools and may further include process, measurement, metrology, and test tools typically used in a manufacturing facility. It will be understood that cell controller 105 may be integrated with host system 102 wherein host system 102 comprises one or more servers and/or workstations used as production equipment controllers (e.g., cell controllers, station controllers, or equipment integration controllers) that interface between the MES and the semiconductor and production equipment 120, allowing and supporting integrated communications.

Host system 102 also includes a data storage component that comprises any form of mass storage configured to read and write database type data maintained in a file store (e.g., a magnetic disk data storage device). Information stored in the data storage component is retrieved and manipulated by host system 102 and may be made accessible to employees of system 100 who have proper access permissions.

System 100 further includes an automated material handling system (AMHS) 103 in communication with host system 102 via communications network 154 and material control system software operating on server 150. AMHS systems track and control the movement of carriers in a manufacturing system such as system 100. It will be understood that AMHS 103 may be installed as an additional integrated system or component of an existing MES application or it may be a separate system and application that interfaces between an MES and MCS. It will be understood that the AMHS/MCS may be purchased commercially as a separate system that can be integrated into an existing MES and FAB, or it may be developed internally. For example, during the 1970's IBM® developed their own AMHS as part of the QTAT Line (Quick Turn Around Time). Although this was only a 80 mm 3-inch wafer line, it had a fully automated material handling system and was a scaled down version of the automated 300 mm FABs that are currently being built.

Also included in system 100 are an intrabay transport system controller 106, a stocker system controller 108, and an interbay transport system controller 110, each of which is linked to AMHS 103 by using communication standards defined by Semiconductor Equipment and Materials International™ (SEMI). These communication standards are E82 (Specification for Interbay/Intrabay Specific Equipment Model (IBSEM)) for the Intrabay and Interbay equipment 112 and 116, respectively, and E88 (Specification for stocker SEM) for stocker equipment 114. Intrabay transport vehicles 112, stockers 114, and interbay transport vehicles 116 are in communication with system controllers 106, 108, and 110 respectively. Movement and tracking of transport equipment 112 and 116 and the materials they transport are facilitated by system controllers 106 and 110 respectively, as well as the MCS. It will be noted that any number of equipment devices and transport vehicles may be utilized by system 100 in order to realize the advantages of the invention. Although the invention as described above employs SEMI™ standards, it will be understood and appreciated by those skilled in the art that other standards may be utilized in addition to, or in lieu of, SEMI™ standards in order to realize the advantages of the invention.

Carrier/Material handoff operations between active equipment (e.g., transport equipment 112 and 116) and passive equipment (e.g., production equipment 120 and stocker equipment 114) may be accomplished via enhanced parallel I/O interface signals utilizing SEMI™ E84 standards. E84 signals are transferred among intrabay transport vehicles 112, stockers 114, and interbay transport vehicles 116 which allow direct communication between them. This will be described further herein.

Client system 152 is linked to host system 102 via network 154. Client system 152 may comprise one or more general-purpose wired or wireless computers and may include such pervasive devices as PDAs, hand-held PCs, pocket PCs, web-enabled cell phones, or any other type of device connected to the network. Network 154 may include wireless technology, radio-based communications, telephony-based communications, or a combination of the above. For purposes of illustration, however, network 154 is a high speed Ethernet LAN. Host system 102 is running suitable communications software such as email which allows information relating to production processes to be presented to end users such as system support personnel on client system 152 via business applications utilizing data management components (e.g., IBM's DB2™). System 100 may also be running a groupware application such as Lotus Notes™, or some other commercially available or internally developed e-mail system.

Figure 2A:
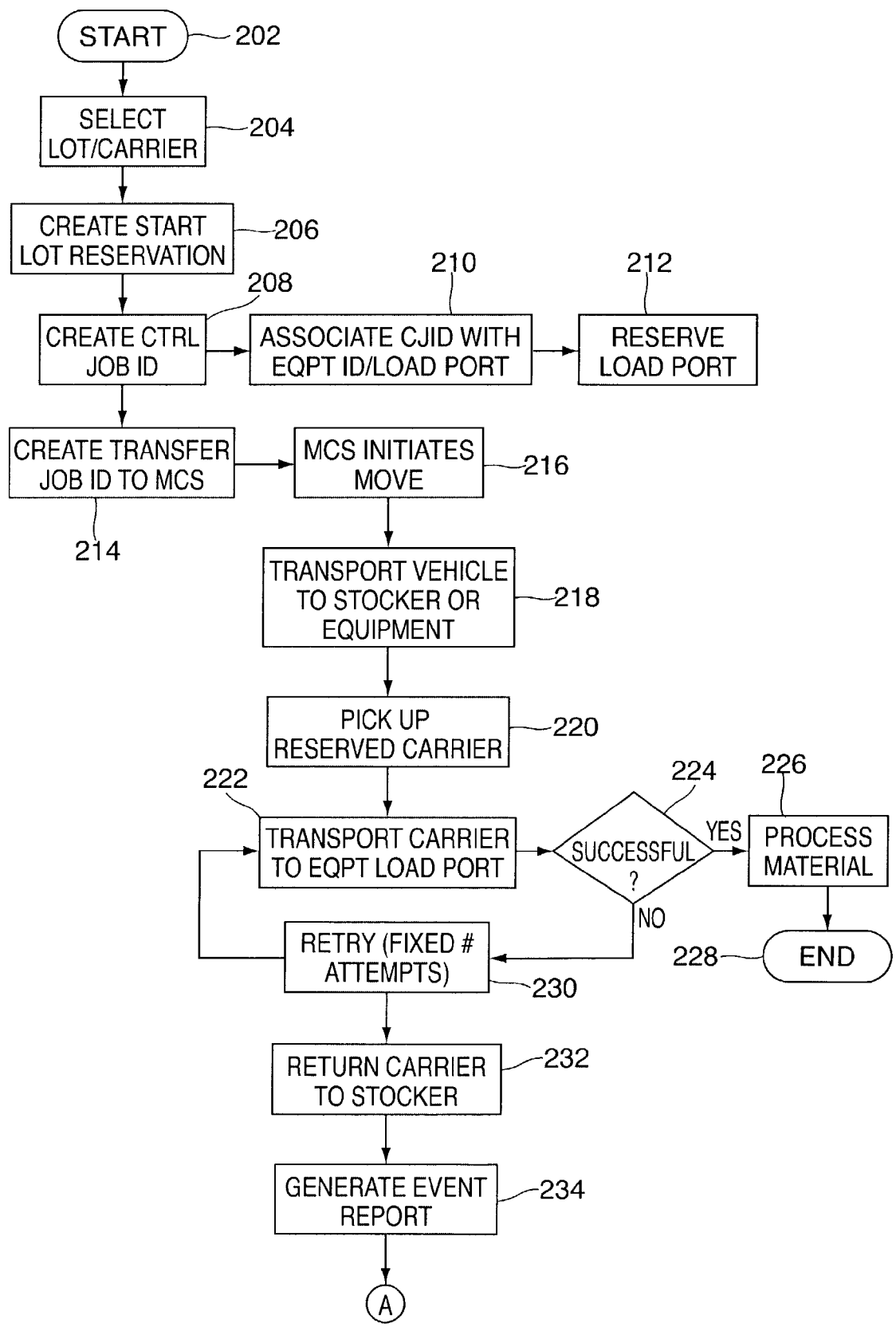
FIGS. 2A and 2B are flowcharts illustrating the process of implementing the integrated transport facilitation system in an exemplary embodiment.

A framework for the flow of information associated with the implementation of the MES and MCS/AMHS and integrated transport facilitation system is described in FIG. 2A with respect to the execution of a manufacturing production process. Although other types of manufacturing environments may benefit from the invention, the semiconductor manufacturing environment is described herein for illustrative purposes.

A manufacturing process is initiated via the MES of host system 102 at step 202. A lot and/or carrier is selected for processing at step 204. This selection may be accomplished manually by a human operator or automatically by an automated dispatch system in the MES. The dispatching system may be part of the MES or may be a separate integrated application or system provided by a third party vendor. Real time dispatching systems and applications are commercially available and will be understood by those skilled in the art. The MES creates a Start Lot Reservation (also referred to as carrier reservation) at step 206, which involves creating a control job ID at step 208, and transfer job ID at step 214. A control job is a unit tracked by the MES that contains one or more process jobs and specifies the order of the process jobs as well as the source and destination of the materials. The control job ID is associated with a specific equipment ID and load port at step 210. The cell controller system 105 reserves the load port via a 'Bind' command transmitted to the equipment 120 at step 212. The transfer job ID is transmitted to the MCS at step 214 and contains the information necessary to initiate the automated move or transport job from the stocker 114 or equipment 120 to the equipment load port. Automated moves include two types: from a stocker to production equipment, and from one piece of equipment to another piece of equipment. The source and destination of the moves can either be the stocker 114 or equipment 120. In some MES's and MCS's, each of the systems will create a uniquely identified transfer job ID which is associated with the move or transaction to execute a move from source to destination. The MCS initiates the transport at step 216. A transport vehicle 112, such as an AGV, RGV, or other type of OHT/OHV or similar device proceeds to stocker 114 or equipment 120 at step 218. The transport vehicle 112 picks up the reserved carrier from stocker 114 or equipment 120 at step 220 and brings it to the reserved equipment load port at step 222. Delivery is initiated at the load port which involves communications between the E84 sensors and the load port. If the delivery is successful at step 224, the material is processed at step 226 and the process ends for the selected lot at step 228. If the delivery is not successful (step 224), delivery may be reinitiated a fixed number of times at step 230 before the aborting the job. In this instance, the carrier is returned to the stocker 114 at step 232 and an event report is generated by the MCS at step 234. A sample event report 300 is shown in FIG. 3.

Figure 2B:
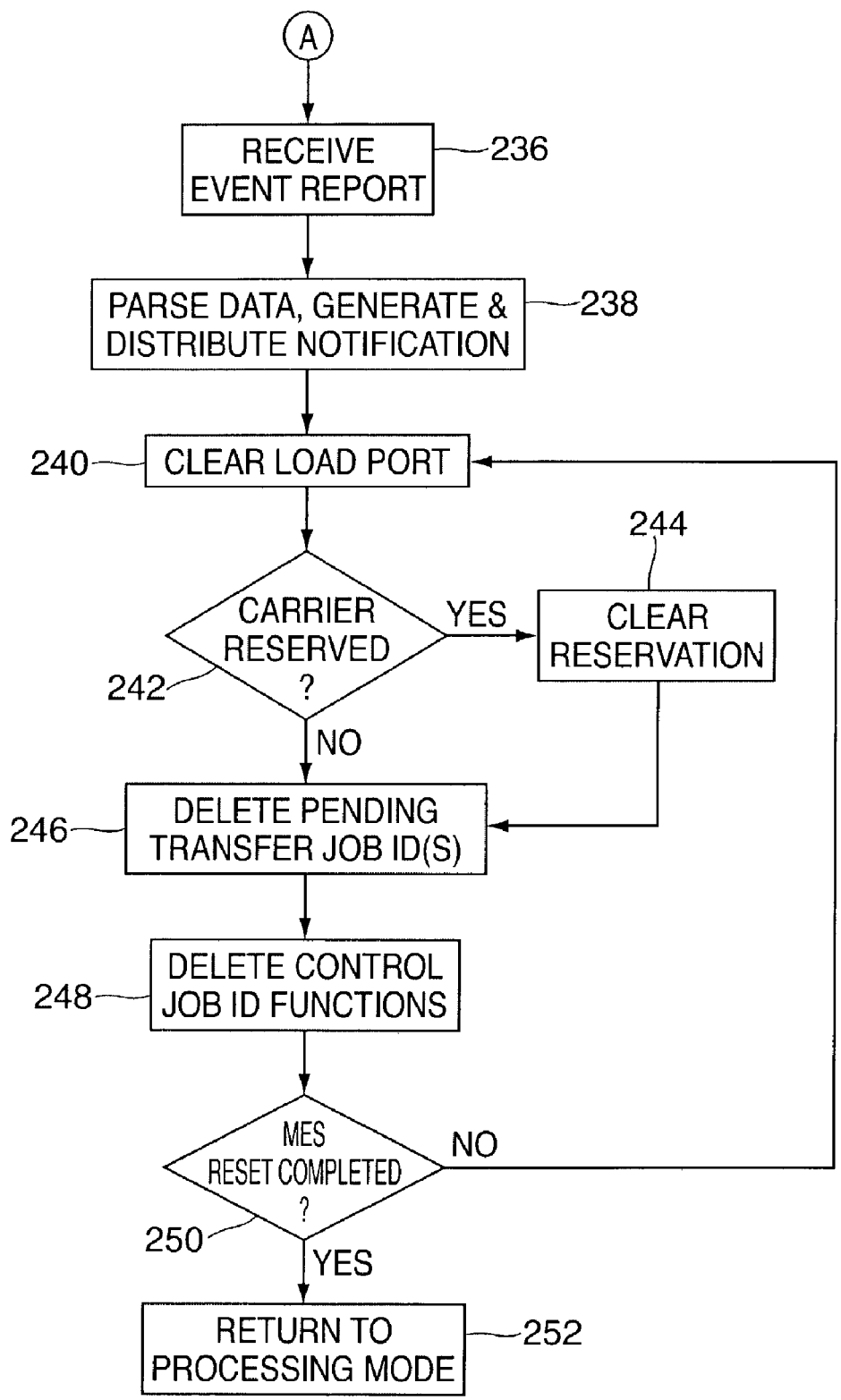

The process continues in FIG. 2B wherein the event report is received by MES and may include some type of report sent from the MCS/AMHS to the MES documenting the 'Carrier Job State Changed' message, informing the MES that this specific transfer job ID and carrier job ID was unable to be loaded to the reserved destination at step 236. The integrated transport facilitation system, either integrated into the MES or developed as a separate integrated application, parses the data in the event report, generates a notification, and distributes the notification to system support personnel at client system 152 at step 238. The integrated transport facilitation system or MES sends the notification to the system support personnel in one of various formats depending on the user selected criteria. For example, the notification could be sent as an e-mail message to the system support personnel or the notification information could be transmitted to a collaborative workplace used by designated support personnel assigned to the task. FIG. 4 illustrates a sample email notification 400 generated by the integrated transport facilitation system. Notification 400 includes a brief description of the failure encountered 402, the lot ID 404, carrier ID 406, and source equipment ID 408. The notification also includes the source stocker 410, destination equipment ID 412, port ID 414, source bay ID 416, source OHV/OHT ID 418, and other information that may be relevant 420. It will be understood that other information may be provided in the automatic notification in addition to, or in lieu of the above, particularly as the supporting systems and structures evolve over time and new parameters and fields of information become relevant. This information assists the system support personnel in determining the type of mechanical or electrical corrective actions to perform at the destination equipment ID 412 and/or port ID 414. Corrective action can be as simple as clearing or removing an unexpected obstacle blocking the delivery, or may be as complicated as troubleshooting an electrical or RF communication problem. The support personnel addressed in the "TO" section 422 of the email notification 400 resolve the issues provided in the notification, if necessary, and note the resolution information via return e-mail or by indicating that the resolution is complete in the collaborative space. The integrated transport facilitation system packages the event reports with notifications and resolution data and stores the data in the data storage component or repository of host system 102 for trend analysis or auditing purposes. The data can take the form of a simple ASCII text log file, or may be parsed into a DB2™ or other database table.

The integrated transport facilitation system then automatically clears the load port data at step 240 as part of a reset mechanism implemented by the integrated transport facilitation system. Aside from the mechanical, electrical, or physical clearing of the load port, step 240 also requires that the MES and/or integrated transport facilitation system software clear the load port logically in the MES. This may be in the form of an MES transaction provided by the MES, or some method or object that the integrated transport facilitation system uses to send the clear command to the MES. This logical clearing of the load port is generally seen as a 'load request state' represented in the MES. A 'load request' means that the load port is now ready or requesting a carrier to be loaded for processing. For example, IBM's SiView Standard™ MES includes a 'start lot reserve cancel' button or feature that is built into the MES logic that allows and supports a user to manually cancel a previous reservation to a load port. This feature could be automated in any MES to provide a means for clearing the reservation remotely utilizing an integrated call from the integrated transport facilitation system.

The integrated transport facilitation system then checks to see if the carrier that failed in transport is still reserved in the MES system at step 242. Using the information provided in the notification of FIG. 4, the integrated transport facilitation system queries the MES database stored in the data storage component of host system 102 for the status of the carrier reservation. If the carrier is still reserved, the integrated transport facilitation system clears the carrier reservation at step 244. If the carrier is not reserved, or alternatively, if the carrier reservation has been cleared, the process continues at step 246 where the pending transfer job ID(s) is/are deleted, followed by the deletion of the control job ID functions at step 248. The integrated transport facilitation system then checks to see if all components reserved have been successfully reset at step 250. If so, the manufacturing process is resumed at step 252. If the MES has not been successfully reset (step 250), one or more of steps 240-248 are repeated as necessary before processing resumes at step 252.

As can be seen, the integrated transport facilitation system allows MES and MCS software systems to communicate failures and resolve them before essential production equipment become idle. Near real-time notifications are generated and distributed upon detection of a failure caused by one or more of various activities and designated personnel or automated systems are activated to resolve the failure.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A method for resolving a transport error over a communications network, said error relating to automated material handling system transactions in a manufacturing environment, the manufacturing environment implementing a manufacturing execution system, the method comprising:
    receiving an event report from a material control system, the event report indicating a transfer job ID and a carrier job ID of a carrier determined to have failed a load operation at a reserved destination;
    parsing said event report into an email notification, the notification including a description of the transport error and at least three of: a lot identifier, a source equipment identifier, a destination equipment identifier, a source stocker identifier, a source bay identifier, a source OHV/OHT identifier, a carrier identifier, and a port identifier;
    transmitting said notification to a collaborative workspace used by designated system support personnel assigned to resolve the transport error;
    using the notification and the collaborative workspace to resolve the transport error before any production equipment in the manufacturing environment becomes idle;
    in response to receiving notice from the system support personnel that the transport error has been resolved, automatically clearing load port data of production equipment assigned to said automated material handling system transactions; and
    identifying and resetting reserved manufacturing execution system components.

2. The method of claim 1, wherein the notice from the system support personnel is executed via at least one of:
    return email; and
    providing resolution information in the collaborative workspace.

3. The method of claim 1, further comprising verifying a reservation status for the carrier, comprising:
    querying a database in the manufacturing execution system for a status of the reserved destination;
    clearing the reservation for the reserved destination if the reservation status indicates the reservation has not been cleared;
    deleting pending transfer job ID and control job ID; and
    verifying successful completion of the resetting reserved manufacturing execution system components before resuming manufacturing operations.

4. A storage medium encoded with machine-readable computer program code for resolving a transport error over a communications network, said error relating to automated material handling system transactions in a manufacturing environment, the manufacturing environment implementing a manufacturing execution system, the storage medium including instructions for causing a server to implement:
    receiving an event report from a material control system, the event report indicating a transfer job ID and a carrier job ID of a carrier determined to have failed a load operation at a reserved destination;
    parsing said event report into an email notification, the notification including a description of the transport error and at least three of: a lot identifier, a source equipment identifier, a destination equipment identifier, a source stocker identifier, a source bay identifier, a source OHV/OHT identifier, a carrier identifier, and a port identifier;
    transmitting said notification to a collaborative workspace used by designated system support personnel assigned to resolve the transport error;
    using the notification and the collaborative workspace to resolve the transport error before any production equipment in the manufacturing environment becomes idle;
    in response to receiving notice from the system support personnel that the transport error has been resolved, automatically clearing load port data of production equipment assigned to said automated material handling system transactions; and
    identifying and resetting reserved manufacturing execution system components.

5. The storage medium of claim 4, wherein the notice from the system support personnel is executed via at least one of:
    return email; and
    providing resolution information in the collaborative workspace.

6. The storage medium of claim 4, further comprising instructions for causing said server to implement:
    verifying a reservation status for the carrier, comprising:
        querying a database in the manufacturing execution system for a status of the reserved destination;
        clearing the reservation for the reserved destination if the reservation status indicates the reservation has not been cleared;
        deleting pending transfer job ID and control job ID; and verifying successful completion of the resetting reserved manufacturing execution system components before resuming manufacturing operations.

7. The method of claim 1, further comprising:
storing event reports, notifications, and resolution information in a data repository for analysis and auditing.

8. The storage medium of claim 4, further comprising instructions for causing said server to implement:
storing event reports, notifications, and resolution information in a data repository for analysis and auditing.

9. A system for resolving a transport error relating to transactions for an automated material handling system in a manufacturing environment, the system comprising:
a host system in communication with a client system and production equipment over a communications network, the host system executing:
material control system software generating an event report for a transport error, the event report indicating a transfer job ID and a carrier job ID of a carrier determined to have failed a load operation at a reserved destination;
manufacturing execution system software receiving the event report;
communications software; and
an integrated transport facilitation software facilitating communication between the manufacturing execution system software and the material control system software, the integrated transport facilitation software performing:
parsing said event report into an email notification, the notification including a description of the transport error and at least three of: a lot identifier, a source equipment identifier, a destination equipment identifier, a source stocker identifier, a source bay identifier, a source OHV/OHT identifier, a carrier identifier, and a port identifier;
transmitting said notification to a collaborative workspace used by designated system support personnel assigned to resolve the transport error;
using the notification and the collaborative workspace to resolve the transport error before any production equipment in the manufacturing environment becomes idle;
in response to receiving notice from the system support personnel that the transport error has been resolved, automatically clearing load port data of production equipment assigned to said transactions; and
identifying and resetting reserved manufacturing execution system components.

10. The system of claim 9, wherein the notice from the system support personnel is executed via at least one of:
return email; and
providing resolution information in the collaborative workspace.

11. The system of claim 9, wherein the integrated transport facilitation software further performs verifying a reservation status for the carrier, comprising:
querying a database in the manufacturing execution system for a status of the reserved destination;
clearing the reservation for the reserved destination if the reservation status indicates the reservation has not been cleared;
deleting pending transfer job ID and control job ID; and
verifying successful completion of the resetting reserved manufacturing execution system components before resuming manufacturing operations.

12. The system of claim 9, wherein the integrated transport facilitation software further performs storing event reports, notifications, and resolution information in a data repository for analysis and auditing.

13. The system of claim 9, wherein said automated material handling system comprises:
intrabay transport equipment in communication with an intrabay transport system controller;
interbay transport equipment in communication with an interbay transport system controller; and
stocker equipment in communication with a stocker system controller;
wherein each of said intrabay transport equipment and said interbay transport equipment comprises at least one of:
an overhead transport vehicle;
an automatic guided vehicle;
a rail guided vehicle; and
an overhead hoist transport vehicle.

14. The system of claim 9, wherein resolution of the transport error by the system support personnel includes at least one of:
removing an obstacle blocking delivery of the carrier; and
troubleshooting an electrical or radio frequency communications problem.

* * * * *